Figures 4, 5, 6:
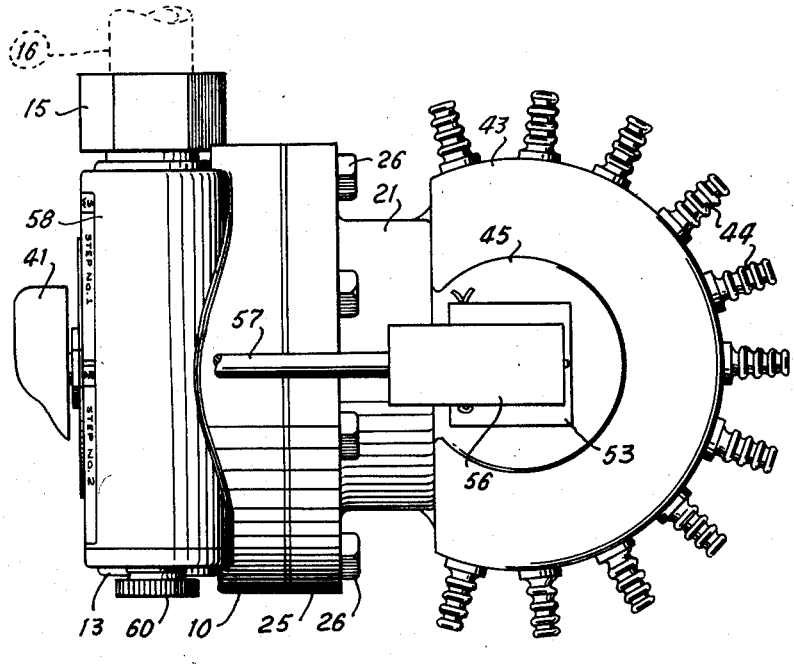

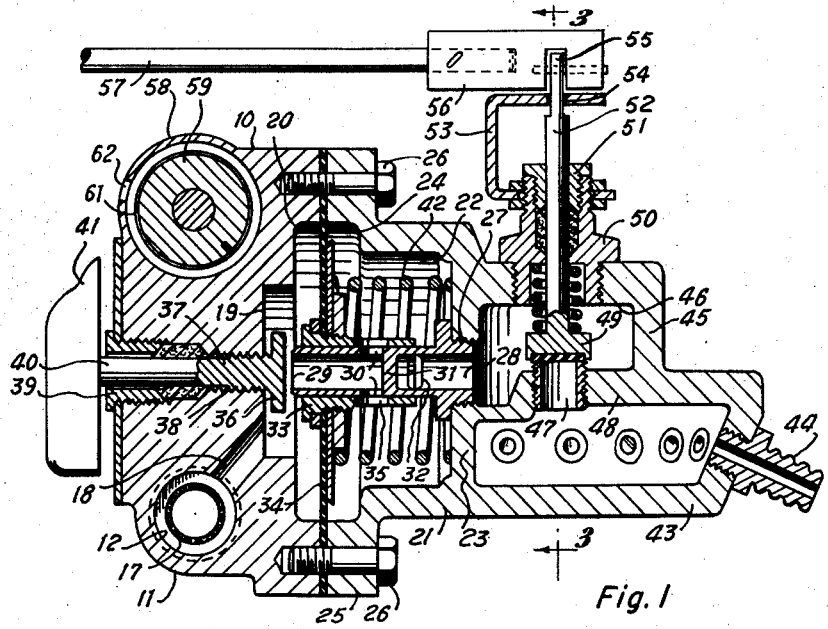
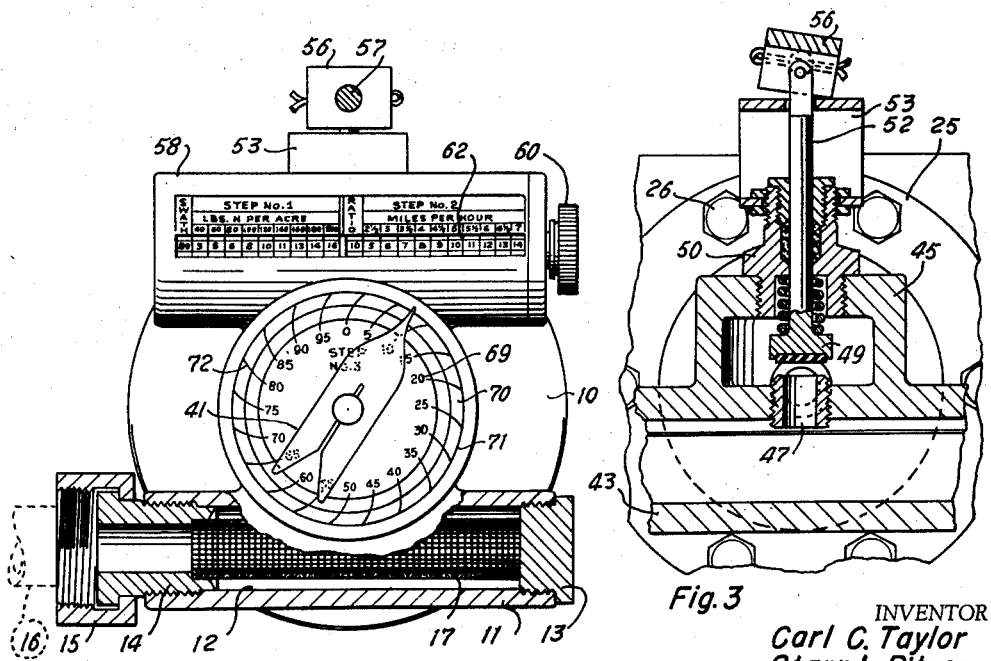
Fig. 1
Fig. 2
Fig. 3
INVENTORS
Carl C. Taylor
Starr L. Pitzer
BY
ATTORNEYS

| S W A T H | STEP NO. 1 | | | | | | | |
|---|---|---|---|---|---|---|---|---|
| | LBS. N. PER ACRE | | | | | | | |
| | 40 | 60 | 80 | 100 | 120 | 140 | 160 | 180 |
| 80" | 3 | 5 | 6 | 8 | 10 | 11 | 13 | 14 |
| 90" | 3½ | 5½ | 7 | 9 | 11 | 13 | 14 | 16 |
| 108" | 4 | 6½ | 8½ | 11 | 13 | 15 | 17 | 19 |
| 114" | 4½ | 7 | 9 | 11½ | 13½ | 16 | 18 | 21 |
| 120" | 5 | 7 | 10 | 12 | 14 | 17 | 19 | 22 |
| 144" | 5½ | 8½ | 11 | 14 | 17 | 20 | 23 | |
| 152" | 6 | 9 | 12 | 15 | 18 | 21 | 24 | |

| R A T I O | STEP NO. 2 | | | | | | | |
|---|---|---|---|---|---|---|---|---|
| | MILES PER HOUR | | | | | | | |
| | 2 | 2½ | 3 | 3½ | 4 | 4½ | 5 | 5½ |
| 3 | | | | | | | 3 | 4 |
| 4 | | | | 3 | 4 | 4½ | 5 | 6 |
| 5 | | | | 3½ | 4½ | 5½ | 6½ | 7½ |
| 6 | | 3 | 4 | 5 | 7 | 8 | 10 | 11 |
| 7 | | 4 | 5 | 7 | 8 | 10 | 11 | 13 |
| 8 | 3 | 5 | 6½ | 8 | 10 | 11 | 13 | |
| 9 | 4 | 6 | 8 | 10 | 12 | 14 | | |

INVENTORS
Carl C. Taylor
Starr L. Pitzer

BY Ashley & Ashley

ATTORNEYS

United States Patent Office 2,915,084
Patented Dec. 1, 1959

2,915,084

FLOW CONTROLLERS

Carl C. Taylor and Starr L. Pitzer, Dallas, Tex.

Application June 2, 1958, Serial No. 739,329

7 Claims. (Cl. 137—501)

This invention relates to new and useful improvements in flow controllers.

The invention is particularly directed to flow control devices or regulators for use in liquid ammonia irrigation systems for assuring the operator of a constant rate of ammonia delivery regardless of the pressure of the ammonia supply or of the back pressure reflected from the points of ammonia delivery.

There are increasing uses in the field of agricultural fertilizing of liquid ammonia delivery systems consisting essentially of a pressure storage tank for liquid ammonia connected through suitable regulating apparatus with a manifold from which a plurality of hoses or other conductors lead to ground-engaging shoes spaced from one another to cover a considerable swath of ground and through which ammonia is directed into the ground for fertilization purposes. Of course, it is desirable to obtain a uniform application of the fertilizing ammonia and hence, the rate of ammonia delivery will depend upon the width of the swath being covered, the heaviness of the fertilization desired, normally expressed in pounds of nitrogen per acre, and the speed at which the tractor or other vehicle passes over the ground surface, normally specified in miles per hour. As, however, ammonia is delivered from the pressure vessel during the course of the working day, the temperature of the ammonia within the pressure vessel will vary in accordance with the ambient temperature and other weather conditions, and accordingly, the pressure at which the ammonia is supplied to the regulating apparatus will correspondingly vary. Conventional pressure regulators have been found to be not suitable for controlling the flow of the ammonia since it is not the pressure of application which is to be maintained, but rather a constant rate of flow in volume or pounds of liquid ammonia.

It is, therefore, one object of this invention to provide an improved flow controller for ammonia fertilizing systems which may be set to deliver liquid ammonia at a constant rate and which will maintain said constant rate regardless of pressure changes, and which is considerably simpler and more reliable in operation than previously existing devices.

A further object of the invention is to provide a flow controller of the character described having an adjustable flow space or orifice which, after adjustment, remains fixed, combined with a variable flow space or orifice which functions to maintain a constant pressure drop across the first orifice thereby assuring the operator of a constant rate of ammonia flow.

An additional object of the invention is to provide an improved flow controller of the character described having unique valve or orifice arrangements providing an extremely rugged and durable structure, yet a structure which is relatively inexpensive to manufacture and to maintain in proper operating condition.

Other and more particular objects will be apparent from a reading of the following specification and claims.

A construction designed to carry out the invention will be hereinafter described, together with other features of the invention.

The invention will be more readily understood from a reading of the following specification and by reference to the accompanying drawings, wherein an example of the invention is shown, and wherein:

Fig. 1 is a longitudinal, vertical, sectional view of a flow controller constructed in accordance with this invention, Fig. 2 is a view in elevation of the front end of the flow controller, a portion thereof being broken away to show the internal structure, Fig. 3 is a fragmentary, vertical, transverse sectional view taken upon the line 3—3 of Fig. 1, Fig. 4 is a plan view in elevation of the flow controller, and Figs. 5 and 6 are fragmentary views of the charts or tables employed in determining the setting of the flow controller.

In the drawings, the numeral 10 designates a substantially cylindrical inlet housing having a transverse cylindrical boss 11 formed integrally of its lower portion. The boss 11 is hollow, being provided with a bore 12, one end of which is internally screw-threaded to receive a screw-threaded plug 13, and the other end being internally screw-threaded to receive the nipple 14 of an ammonia inlet coupling 15 from which a suitable conductor, such as the ammonia hose 16, extends to the liquid ammonia storage tank (not shown). An elongate tubular screen member 17 has one end recessed in the nipple 14 and the other end recessed in or bearing against the plug 13 so as to strain and filter the liquid ammonia entering the bore 12 from the nipple 14.

From the bore 12, a flow passage 18 extends upwardly at an angle through the body of the housing 10 and opens into a flat cylindrical recess or chamber 19 which, in turn, opens into a somewhat larger, shallow diaphragm chamber 20. Thus, liquid ammonia under storage tank pressure is admitted from the conductor 16 through the bore 12 and passage 18 into the recess 19 and chamber 20.

A hollow, cylindrical pressure housing 21 is provided with an axial internal bore 22 terminating in a bottom wall 23 at one end and opening at its other end into a shallow, enlarged diaphragm chamber 24. An annular, external flange 25 surrounds the chamber 24, and securing bolts 26 extend through the flange into the inlet housing 10 for securing the pressure housing thereto. In the bottom wall 23 of the bore 22, there is provided a screw-threaded opening 27 for a screw-threaded and flanged, tubular valve guide 28 which extends through the diaphragm chambers 20 and 24 and slightly into the recess 19. The end of the guide member 28 within the recess 19 is provided with a valve seat 29, and a pair of diametrically opposed ports 30 open laterally from the bore of the guide member 28 within the chamber 22. A transverse web or partition 31 extends across the bore of the guide member 28 adjacent the ports 30, and a slotted opening 32 is provided in the wall of the guide member on the opposite side of the partition 31.

A sleeve valve 33 is slidably mounted upon the valve guide 28, the sleeve valve extending through and being clamped in the central portion of a flexible diaphragm 34 extending transversely of the controller structure between the diaphragm chambers 20 and 24 and having its marginal edges clamped between the flange 25 and the body of the inlet housing 10 whereby, as the diaphragm member 34 flexes under pressure changes, the sleeve valve 33 will be caused to move longitudinally over the outer surface of the valve guide member 28. The sleeve valve is provided with radial ports 35 constantly in register with the ports 30 regardless of the longitudinal position of the sleeve valve while the inner end of the sleeve valve overlies the slotted opening 32 and is adapted to cover and uncover the opening in accordance with movements of the sleeve valve in response to flexing of the diaphragm 34.

For regulating the admission of liquid ammonia into the bore of the valve guide 28, there is provided a flat valve disk 36 having a screw-threaded stem 37 positioned in a screw-threaded bore 38 provided in the bottom of the recess 19 and opening through a packing gland 39 to the front or face of the housing 10. The shank 40 of the valve 36 extends through the packing gland and externally of the inlet housing 10 to receive a knob or handle 41 by which the shank may be rotated to position the valve 36 with respect to the valve seat 29. The bore 38 and stem 37 carry left-hand screw-threads whereby rotation of the handle 41 in a clockwise direction as viewed in Fig. 2 will result in movement of the valve disk 36 away from the valve seat 29 and increase the spacing between the valve disk and the seat for a corresponding increase in the rate of flow of liquid ammonia into the bore of the guide member 28.

A coiled or helical spring 42 is confined between the diaphragm and the bottom wall 23 of the bore 22 and constantly urges the diaphragm into the chamber 20 so as to open or uncover the slotted opening 32 and increase the rate of flow of ammonia from the bore 22 through the openings 32 and into the interior of the guide 28.

A hollow manifold enclosure 43 is formed integrally of the pressure housing 21 and is in the form of a relatively flat, semicylindrical disk extending from the wall 23 and having a plurality of connection fittings 44 projecting radially and downwardly therefrom for reception of a plurality of hoses or other conductors for conveying ammonia to the various points of application. A hollow, cylindrical box 45 surmounts the enclosure 43, also being formed integrally with the pressure housing 22 and having a hollow interior 46 into which the tubular valve guide 28 opens. A screw-threaded, tubular valve seat 47 extends through the partition 48 between the interiors of the boss 45 and the enclosure 43, and a spring-pressed disk valve 49 is adapted to be moved into or out of engagement with the upper end of the seat member 47 to shut off or admit ammonia from the interior of the boss 45 to the interior of the enclosure 43. Any suitable means may be employed for reciprocating the disk valve 49, it having been found suitable to provide a flanged collar 50 which is screw-threaded into position in the upper wall of the boss 45 and provided with a packing gland 51 through which the shank 52 of the valve 49 extends upwardly and externally of the gland 51. A C-shaped bracket 53 has its lower leg clamped upon the upper end of the collar 50, the upper leg of the bracket being provided with a rectangular slot 54 through which the flattened upper end 55 of the shank 52 extends for pivotal connection to an operating cam 56 of rectangular cross-section which is provided with an elongate operating handle 57. As is apparent from Figs. 1 and 3, rotation of the cam 56 by the handle 57 will result in upward and downward reciprocation of the valve disk 49 due to the rectangular cross-section of the cam, and accordingly, the passage into the enclosure 43 through the valve seat member 47 will be opened and closed as desired by the operator. In use, this valve structure is employed only for placing the flow controller into or out of operation and does not affect the rate of ammonia flow or delivery.

For determining the proper setting of the handle 41 and the valve disk 36, the inlet housing 10 is provided with a transverse cylindrical and hollow boss 58 formed integrally of the upper portion of the housing and enclosing a rotatable spool 59 having an externally-projecting knob 60 and carrying an indicia sheet 61 which may be viewed through a transverse slot 62. As shown in Figs. 5 and 6, the indicia sheet 61 is divided into a left-hand section 63 and a right-hand section 64, the left-hand section 63 comprising a matching of swath widths 65 against the density of fertilizer application in pounds of nitrogen per acre 66 to furnish ratio numbers 67 which, in the right-hand section 64 of the indicia sheet are matched against tractor speeds 68 in miles per hour to provide arbitrary valve setting numbers 69. The inlet housing 10 is provided upon its front end with a circular dial or scale 70 displaying the setting numbers 69 in circular fashion and extending from 0 to 95. In utilizing the indicia sheet 61, the width of the swath being fertilized is matched against the desired heaviness of fertilizer application to obtain the proper ratio number 67 which is then matched against the tractor speed to provide the proper setting number to which the handle 41 is turned upon the dial 70. This will position the valve disk 36 a predetermined distance from the valve seat 39 so as to provide a flow space or flow orifice regulating the rate of ammonia application.

It is noted that the dial 70 is provided on its margin with three concentric lines 71 and that each of the numbers 69 appearing on the dial are provided with a curved line 72 extending generally outward from the center portion of the dial. These lines are employed to make compensation for the pressure in the ammonia storage vessel at the time the valve setting is made, the inner line, for instance, may represent a pressure of 100 pounds per square inch, the middle line a pressure of 150 pounds per square inch, and the outer line a pressure of 200 pounds per square inch. In setting the handle or pointer 41, the appropriate setting line is employed, of course, after a reading of the pressure gauge which is standard equipment on all ammonia fertilizer storage vessels. Once the flow valve has been set, there need be no further setting as the temperature of the ammonia storage vessel increases or decreases, resulting in an increase or decrease of the pressure within the vessel, since the flow controller forming the subject matter of this invention automatically compensates for such changing pressures.

In the operation of the flow controller, the valve disk 36 is properly positioned, as described hereinabove, for the desired rate of ammonia application, after which the valve disk 49 is lifted from its seat to initiate the flow of the ammonia. Liquid ammonia will enter the bore 12 from the conductor 16 and pass upwardly through the passage 18 into the recess 19 and the diaphragm chamber 20, exerting storage tank pressure against the diaphragm 34 and compressing the spring 42 to shift the sleeve valve 33 to the right, as viewed in Fig. 1, covering or partially covering the slot 32.

The liquid ammonia flows from the recess 19 into the interior of the valve guide 28 and outwardly through the ports 30 and 35 into the bore 22 as well as into the second diaphragm chamber 24. The ammonia will still be liquid at this point and will exert a pressure upon the diaphragm 34 supplementing the pressure being exerted by the spring 42. This force will tend to move the sleeve valve 33 to the left, as viewed in Fig. 1, uncovering the slot 32 and permitting the liquid ammonia to flow through the slot 32 and the interior of the guide 28 into the interior of the boss 45 while at the same time vaporizing into gaseous ammonia. The vaporized ammonia, of course, then passes into the interior of the manifold 43 and outwardly through the fittings 44 to the distributing hoses and application shoes.

The spring 42 may be of any suitable or desirable size and strength, it having been found desirable to employ a spring which results in the creation of a 5 to 10 pound pressure drop between the recess 19 and the bore 22. Of course, the pressure selected will remain constant since the compressive force of the spring 42 does not vary appreciably in its short length of flexure.

Assuming that a pressure drop of 7 pounds per square inch has been selected and the appropriate spring 42 employed to achieve such pressure drop, then in the operation of the flow controller, as pressure tends to increase in the bore 22 and result in a pressure drop of less than 7 pounds per square inch, the diaphragm 34 will be moved to the left to uncover further the slot 32, permitting the vaporization and discharge of greater quantities of ammonia from the bore 22 into the interior of the boss 45, thereby reducing the pressure in the bore 22 and again bringing about a constant 7 pound pressure drop. As the pressure within the bore 22 tends to decrease, causing a pressure drop of more than 7 pounds per square inch, the diaphragm 34 will be moved to the right by the greater pressure exerted in the diaphragm chamber 20, thus partially covering the slot 32 and reducing the rate of ammonia discharge whereby the pressure within the bore 32 will again build up to the desired level, and in this manner, the diaphragm 34 quickly assumes and maintains an operating position in which the slot 32 is covered to the proper degree to insure a constant and pre-selected pressure drop between the recess 19 and the bore 22. Having the equivalent of a fixed orifice in the flow space between the valve 36 and the seat 29, and having a fixed pressure drop across such orifice and through which the liquid ammonia is flowing, it inherently follows that a constant rate of ammonia delivery will be achieved.

Liquid ammonia has the property of varying the pressure it exerts in a storage vessel in accordance with its temperature, but of varying to virtually no extent in density in accordance with temperature change. Accordingly, as the temperature in the liquid ammonia storage tank increases or decreases, the pressure within the storage tank will increase or decrease, but the volume and density of the liquid ammonia will remain substantially constant. Accordingly, the flowing of the liquid ammonia through a fixed orifice at a constant pressure drop results in the delivery of a constant weight or volume of liquid ammonia regardless of the pressure existent within the liquid ammonia storage tank. For this reason, the operator may disregard the ammonia tank pressure and temperature once the flow controller has been set for the desired rate of delivery, and yet, be assured of a constant rate of delivery.

The utilization of the tubular valve guide 28 and the sleeve valve 33 slidable thereon, together with the interconnection of the chambers 19 and 22 through the sleeve valve and valve guide and the cooperation of the valve 36 with the valve guide, provide a very simple, yet durable and reliable, flow controller of high operational accuracy. Further, the utilization of the sleeve valve structure avoids the effect that back pressure might have on the rate of ammonia flow and insures a constant flow at the selected rate. Many valves, especially when nearly closed, create a localized zone of lowered pressure which affects the valve bias and usually tends to close the valve to an undesirable degree or urge the valve toward a closed position. In the present structure, this tendency is avoided, and the entire flow controller structure provides a uniform rate of ammonia flow, as previously selected, regardless of variations in the ammonia storage tank pressure or the back pressure from the ammonia delivery shoes.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A flow controller including, a controller housing, the housing having a chamber therein, a diaphragm dividing the chamber into first and second diaphragm chambers, a sleeve valve guide carried by the housing and extending through the diaphragm between the first and second diaphragm chambers, a sleeve valve slidably mounted on the valve guide and movable with the diaphragm, a fluid inlet opening into the first diaphragm chamber, a fluid outlet from the housing, the valve guide having a first flow passage opening into the first diaphragm chamber and a second flow passage communicating with the fluid outlet, adjustable orifice means for controlling the rate of fluid flow from the first diaphragm chamber to the first flow passage of the valve guide, means for maintaining the first flow passage constantly in communication with the second diaphragm chamber, the valve guide having a port opening from its second flow passage to the second diaphragm chamber and arranged to be covered and uncovered by the sleeve valve as the diaphragm flexes, and spring means constantly urging the diaphragm toward the first diaphragm chamber to uncover the port.

2. A flow controller as set forth in claim 1, and manually operable means extending externally of the housing for adjusting the orifice means.

3. A flow controller as set forth in claim 1, and manually operable valve means for shutting off communication of the second flow passage of the valve guide with the fluid outlet.

4. A flow controller as set forth in claim 1, wherein one end of the valve guide forms a part of the adjustable orifice means.

5. A flow controller as set forth in claim 1, wherein the adjustable orifice means comprises, a valve seat on the end of the valve guide within the first diaphragm chamber, and a valve disk movable toward and away from the valve seat.

6. A flow controller as set forth in claim 1, wherein the adjustable orifice means comprises, a valve seat on the end of the valve guide within the first diaphragm chamber and through which the first flow passage of the valve guide extends, and a valve disk movable toward and away from the valve seat.

7. A flow controller as set forth in claim 1, wherein the means for maintaining the first flow passage constantly in communication with the second diaphragm chamber includes constantly registering parts in the valve guide and sleeve valve through which the first flow passage of the valve guide opens into the second diaphragm chamber.

References Cited in the file of this patent

UNITED STATES PATENTS

| 2,488,647 | Teague | Nov. 22, 1949 |
| 2,623,331 | Greening | Dec. 30, 1952 |
| 2,807,144 | St. Clair | Sept. 24, 1957 |

FOREIGN PATENTS

| 11,212 | Great Britain | of 1912 |